Dec. 7, 1954     W. SHOCKLEY     2,696,565
ELECTROOPTICAL CONTROL SYSTEM Filed Nov. 6, 1952     4 Sheets-Sheet 1

Fig. 1

INVENTOR.
WILLIAM SHOCKLEY
BY Kenway, Jenney, Witter
& Hildreth
ATTORNEYS

Dec. 7, 1954 W. SHOCKLEY 2,696,565
ELECTROOPTICAL CONTROL SYSTEM
Filed Nov. 6, 1952 4 Sheets-Sheet 3

INVENTOR.
WILLIAM SHOCKLEY
BY Kenway, Jenney, Witter
& Hildreth
ATTORNEYS

Dec. 7, 1954 W. SHOCKLEY 2,696,565
ELECTROOPTICAL CONTROL SYSTEM
Filed Nov. 6, 1952 4 Sheets-Sheet 4

Fig. 8

INVENTOR.
WILLIAM SHOCKLEY
BY Kenway, Jenney, Witter & Hildreth
ATTORNEYS

United States Patent Office 2,696,565
Patented Dec. 7, 1954

2,696,565

ELECTROOPTICAL CONTROL SYSTEM

William Shockley, Madison, N. J.

Application November 6, 1952, Serial No. 319,161

10 Claims. (Cl. 250—201)

The present invention relates to an electro-optical control system and, more particularly, to a control system having optical means for determining the relative positions of a group of objects and for generating electrical signals indicative of the deviation of the actual relative positions of said objects from preassigned relative positions.

In existing systems for automatically positioning two or more objects with respect to each other (as in automatic assembling systems or automatic machining apparatus), the usual procedure is to pre-determine precisely the operative positions of the objects and set them in those positions. For example, if a piece is to be machined automatically to a certain shape, the cutting head is given a fixed, accurate position, the work piece is fixedly positioned, and the cutting strokes are given fixed stops. Such a system is not self-correcting; that is, if the work piece is positioned improperly, or if one of its dimensions varies with respect to the cutting stroke, these errors are carried over to the cutting operation. In automatic assembly machines, improper positioning not self-corrected can result in jamming or breakage. Furthermore, automatic assembly is made very difficult where the addition of new work pieces must be made so as to cancel out errors in the absolute positions of pieces already assembled, as in vacuum tubes. These difficulties all stem from the fact that existing systems work from absolute positions rather than responding to the relative positions of the objects being brought together.

It is, therefore, the principal object of the present invention to provide a control system for machines and the like, wherein the control function is generated by optical apparatus which views the objects under control and detects departures or errors in the relative positions thereof, either between two or more objects or between a reference and one or more objects, and generates electric error signals proportional to the optically determined positional deviation.

More specifically, it is an object of the invention to provide an electro-optical control apparatus wherein optical patterns of desired object positions may be automatically compared with optical images of actual relative positions of the objects and electrical signals for control purposes derived from the pattern comparison.

Still another object of the invention is to provide an electro-optical control system wherein relatively complex operations or series of operations may be carried out automatically in accordance with a predetermined plan or program, with complete control of object positions linearly and rotationally, if required, and wherein the actual positions of the objects may be under constant optical comparison with the desired positions, throughout the programmed sequence.

A further object is to provide an electro-optical control apparatus having means for distinguishing the information relating to one object from that relating to another object when both are in the field of view.

With these and other objects in view, a feature of the present invention involves the provision of electro-optical error detecting means wherein an optical viewer or "eye" compares an image of the actual situation or disposition of the objects with a pattern representing the desired situation of the objects. The "eye" is given varying displacements and the differences in the displacements required to produce conditions of best match between the various objects may then be interpreted as error signals. The pattern representing the desired situation may consist of a positive photographic transparency photographed through optics equivalent to those of the viewer. (Patterns for certain special applications may, however, comprise quite different means.) The information relating to the image and pattern for one object is distinguished from that relating to the image and pattern of another object when both are embraced in the same viewing device. This is done by separating light falling through different areas of the transparent pattern by opaque walls so that light from the pattern of only one object falls on a photosensitive device. Alternatively, color on the pattern and color filters on the photosensitive devices may be used.

From the optical pattern comparison, electrical signals are generated which constitute error signals available for control purposes, since they represent the error between an actual situation and a desired situation. In a servo system based on the present invention these error signals may activate motors which move the parts in a direction to minimize or eliminate the errors in positional relation and thus bring about the desired situation. In general, in servo systems the error signal is generated by the difference between a planned position or condition of one part and the then position of the driving mechanism which moves the part. The actual location of the part need not be determined directly in any set of coordinates. In the present invention the location of one object is optically observed and the error signal is dependent upon its planned position with respect to neighboring objects. The present invention is therefore ideally suited to act as the error-sensing element in a servomechanical loop having power operated means for carrying out the positioning operations in accordance with the input data.

In the drawings illustrating the invention.

Figure 1:
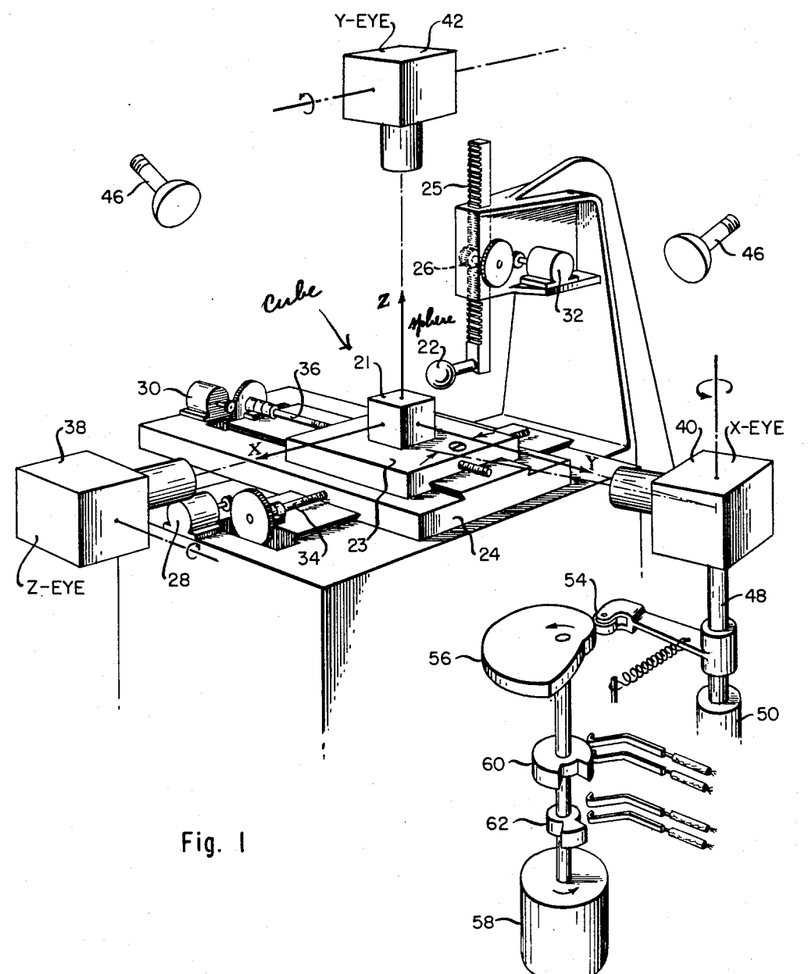
Fig. 1 is a view, partly schematic, illustrating a machine having power operated means for effecting relative positioning of two objects, shown as a sphere and a cube, and employing the electro-optical control system of the invention as the error-detecting portion of the servo system.

The machine shown in Fig. 1 is for purposes of illustration only, and is to be considered merely as representative of a machine having power-operated means for bodily moving objects, which may be a tool and a work piece, or parts to be assembled, into predetermined positions relative to one another.

The two objects, for ready identification, are shown as a cube 21 and sphere 22. The cube 21 is mounted on the table 23 which slides in ways on the table 24 which itself moves in ways so that the cube can be moved in two mutually perpendicular horizontal directions. For convenience of discussion, a coordinate system X, Y and Z is indicated, having its origin at the center of the cube 21. The cube is movable in the X and Y-directions. The sphere 22 is mounted on a rack 25 driven by a pinion 26, so that it is capable of motion in the Z-direction. The two objects are moved in the X, Y and Z directions by servomotors indicated respectively at 28, 30 and 32. The motor 32 rotates the pinion 26 to move the sphere 22 up and down. The motor 28 operates through a gear to lead screw 34 to slide the table 24 and the cube in the X-direction, and the motor 30 operates through a gear to the lead screw 36 to slide the table 23 and the cube in the Y-direction.

To determine the relative positions of the sphere and cube, three viewing devices or "eyes" 38, 40, 42 are located on the X, Y and Z axes, respectively. Each eye is provided with an image-forming lens system, and a photo-sensitive element, as will be described below. Appropriately placed lights 46 provide illumination of the objects so that images of adequate intensity are formed by the optical systems of the respective viewing means.

To enable the viewing devices to determine the magnitude of the error in the actual position of the objects, as compared with the desired position, the viewing devices are provided with prepared patterns or proxies, with respect to which the optical images of the objects are compared. According to one embodiment of the invention, the extent of the positional discrepancy is detected by causing the viewing device to scan or sweep a field containing the objects, with appropriate devices for ascertaining the successive registrations of proxy and image for one object and the other, and determining the positional discrepancy in terms of the time difference between said detected registrations.

In accordance with the embodiment illustrated in Fig. 1, each viewing device or eye is mounted for sweeping or scanning along a particular axis. Thus, the eye 38, mounted on the X axis, is arranged to sweep the Z axis, and therefore determines object positions with respect to the Z axis. The eye 40, on the Y axis, sweeps the X axis, while the eye 42 on the Z axis scans the object in the Y direction.

To accomplish this sweeping or scanning, various mounting arrangements may be employed; that shown in Fig. 1 is to be regarded as illustrative only. The viewing device or eye 40 is mounted on a shaft 48 in a suitable pivotal support 50 which permits rotation about the dot-dash axis parallel to the Z-axis. A spring 52 tends to cause the eye to rotate in the +X direction. Such rotation presses a cam follower 54 against the cam 56. A motor 58 rotates the cam so that the eye swings back and forth in an arc about the axis of its mounting. The cam is so shaped as to produce a uniform sweep of constant angular velocity ω in one direction, followed by a quick return. The motor shaft is provided with sets of rotary contacts indicated generally at 60 and 62. These contacts operate in timed relation to the forward and return sweeps of the eye to open and close circuits in the electronics associated with the eyes in a manner to be described below.

For purposes of the description of the invention, the illustrated positions of the sphere and cube are assumed to be approximately those corresponding to the desired relative positions. Furthermore, in order to simplify the discussion at this point, the cube is assumed to have the correct rotational orientation. Under these conditions, each of the three eyes determines the error in relative position along one of the coordinate axes. The way in which the eyes function is sufficiently described in terms of one of the eyes, for example the eye 40 (termed the X-eye) which is located on the Y-axis and scans or views the X-axis relationship of the objects.

Figure 2:
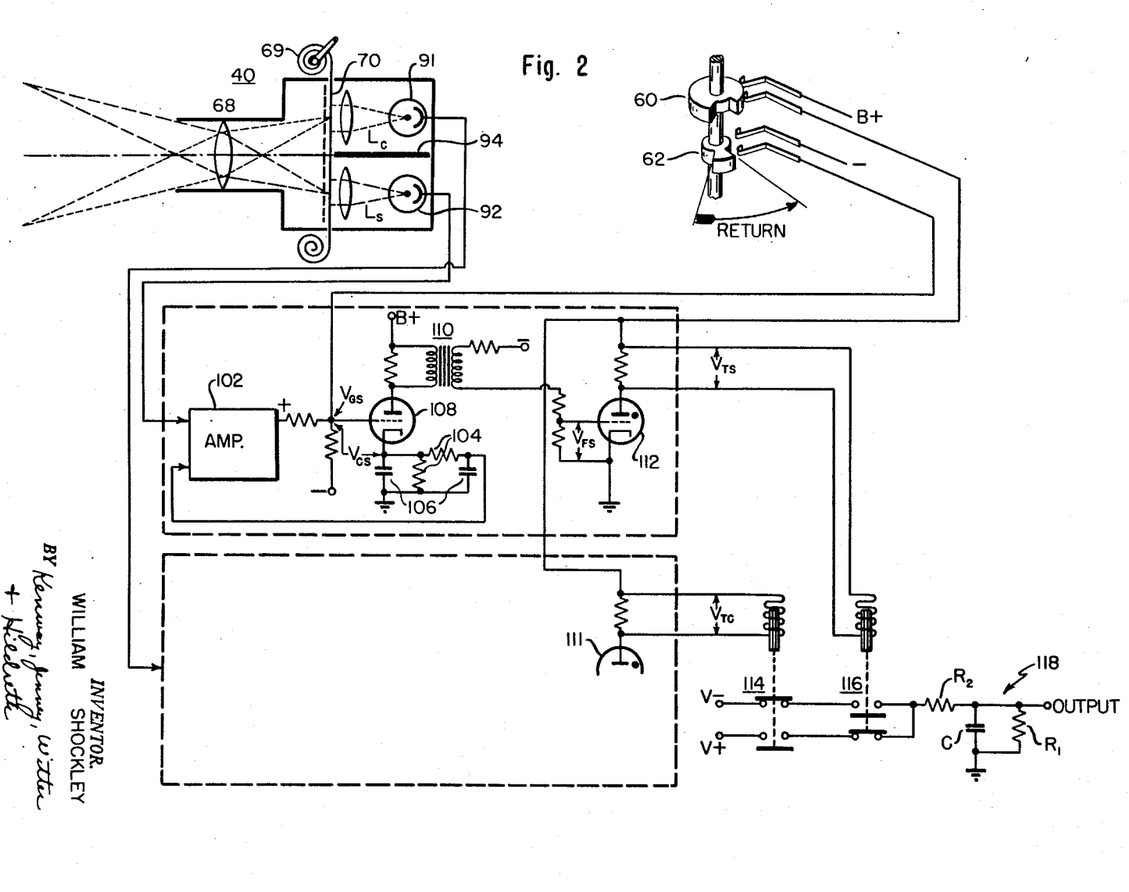
Fig. 2 is a schematic diagram of the electro-optical image and pattern comparing means by which positional errors are converted into electrical error signals for control of the power drives.
Figure 3:
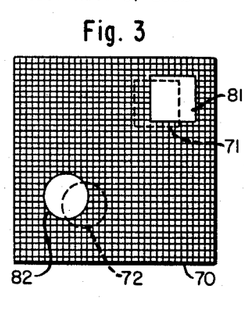
Fig. 3 is a view representing the appearance of a control pattern of the desired position of sphere and cube at a predetermined instant in the control program, with a superposed optical image of the actual positions of said objects at that instant.
Figure 4:
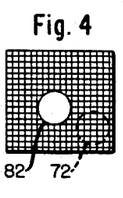
Figs. 4, 5, 6 and 7 are views illustrating the relative shift of pattern and image positions during the actuation of the viewing means.
Figure 5:
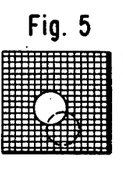

This X-eye 40 comprises a lens system 68 which projects images of the viewed objects on a pattern 70, as shown in Figs. 2 and 3. The pattern is a transparency, such as a photograph or silhouette showing the objects in their desired relative position. Such a pattern can be made by making a high contrast positive transparency from a photograph taken through the eye, or made independently through a lens preferably of comparable focal length. The focal length of the lens is such that the cube and sphere images 71 and 72 are approximately in focus on the pattern. As a result, if the sphere and cube are in their correct position, at some point in the sweep or scan of the eye, the images of the sphere and cube will fall on correspondingly shaped transparent areas of the pattern.

As has been indicated, the X-eye 40 sweeps its optical axis through a limited angle about its rotational axis parallel to the Z-axis. For purpose of the analysis which follows, the angular departure of the optical axis from the Y-axis, or a parallel thereto, is denoted by $\theta$ and expressed in radians. Accordingly, when the optic axis is parallel to Y, $\theta$ is defined as zero. Positive values of $\theta$ correspond to rotations which deflect the optic axis of the X-eye in the positive X-direction.

Fig. 3 shows the appearance of the pattern 70 as it would be seen looking at it from the —Y direction, that is, from the back side of the X-eye. The pattern is an opaque area broken by transparent areas 81 and 82 corresponding to the cube 21 and sphere 22 respectively. The pattern is, of course, inverted by the lens and appears to be rotated by 180° with respect to the actual sphere and cube. Also represented on the pattern by the dotted lines 71 and 72 are the real images of the cube and sphere, respectively, as formed by the lens when $\theta=0$. It can be seen that the positions along the X-axis of the sphere and cube are closer together than desired.

In the subsequent discussion it will be necessary to distinguish portions of pattern from each other and to indicate to which object a given portion of the pattern corresponds. For this purpose the portion of a pattern that corresponds to an object is referred to as the "proxy" for that object, hence the transparent areas 81 and 82 are proxies for the cube and sphere, respectively. In the pattern shown in Fig. 3, the proxies are essentially photographs or silhouettes of the objects. The word "image" is used to indicate the light configuration in or near the plane of the pattern produced by an object and projected by the optical system, the images of cube and sphere being shown at 71 and 72. The subscripts C and S will be used where it is necessary to identify proxies, images, coordinates and light fluxes associated with the sphere and cube, respectively.

Figs. 4, 5, 6 and 7 show the appearance of the sphere proxy 82 and the sphere image 72 for several values of $\theta$ as seen by looking at the back of the eye. The situation represented corresponds to a case in which the sphere is higher than its reference position so that its image is lower than its proxy. The sphere is also displaced in the +X direction from its reference position and thus appears to the right of the proxy when $\theta=0$.

Figure 6:
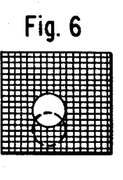
Figure 7:
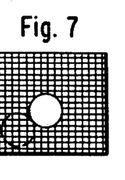

If the displacement of the sphere from its reference position is $\Delta x_s$ and the distance from the axis of rotation of the viewing eye to the sphere is D, then the condition of best match of the sphere image 72 and the proxy 82 will occur approximately when $$\theta_s = \Delta x_s / D$$

and be as represented in Fig. 6. The angle $\theta$ at which this condition of best match occurs can be determined from the light flux through the pattern, in a manner to be described.

It will be supposed that the sphere is brightly and uniformly illuminated against a black background. Under these conditions the light flux through the pattern is proportional to the common area of sphere image and sphere proxy in Figs. 4, 5, 6 and 7. As a consequence, the light flux, denoted by $L_s$, depends on $\theta$. It reaches a maximum at the point of best match, namely, $\theta_s$ equal to $\Delta x_s/D$.

The same considerations apply to the case of the cube. Thus, if the displacements along the X axis are denoted by $\Delta x_s$ and $\Delta x_c$ for sphere and cube respectively, it follows that the light flux maxima occur at a difference in angle $\Delta \theta_{SC}$ where $$\Delta \theta_{SC} = \theta_S - \theta_C = (\Delta x_s - \Delta x_c)/D$$

It is recognized that this expression is not quite exact, since displacements along the Y-axis will introduce small angular displacements through parallax for objects whose X-coordinates are different from zero. These effects, however, will be smaller than the primary effect given above in the ratio of $\Delta y / D$. They can thus be made negligible by making D large. They will also be unimportant in applications in which servomotors operate to zero any $\Delta y$ errors.

It is of importance to note that to a first approximation, errors in positioning the pattern as a whole in respect to the "eyes" cancel out. Likewise errors in the initial position of the optic axis of the eye in respect to the shaft 48 which rotates the "eye," cancel out. The reason for this cancellation is that such errors produce equal errors in $\theta_s$ and $\theta_c$ and thus do not affect the observation of the error in relative position. This is considered to constitute a fundamental advantage of the present invention over the prior art, since it relates the measurement of error to the relative positions of the objects with respect to their desired relative position, as based on a control pattern, as distinguished from control in terms of absolute position.

It may also be noted that if the pattern is rotated slightly about the optic axis of the X-eye, non-compensating errors will occur if the two objects are at different heights, or Z-positions. This results from the fact that under such conditions a relative motion along the X-axis of the proxies results from the rotation. This effect is proportional to the separation of the objects in the Z-direction. This relationship has the property of making the error from this cause small as the objects approach each other closely. Thus, the effect of such errors is unimportant in mechanical operations, since in such operations high accuracy of relative position is of importance only when objects are in close proximity.

From the foregoing discussion it is evident that if, during the sweep caused by the motor 58 and cam 56, the angular velocity is a constant $\omega$ radians per second, then the relative position error $\Delta x_{sc}$ is given to a high degree of accuracy by:

$$\Delta x_{sc} = \Delta x_s - \Delta x_c = D\Delta\theta_{sc} = D\omega(t_s - t_c)$$

where $t_s$ and $t_c$ are the times expressed in seconds at which the maxima occur in $L_s$ and $L_c$ respectively. This expression is algebraically correct in the sense that if $t_s$ is greater than $t_c$ the sphere lies in the $+X$ direction with respect to its correct relative position, and if $t_s$ is less than $t_c$, it lies in the $-X$ direction. The problem of generating an error signal is thus reduced to producing a signal, voltage, or current, proportional to the time difference between the two maxima in light fluxes.

Means for deriving such a signal as a function of the time difference in the maxima are shown in diagrammatic fashion in Fig. 2 for the X-eye 40. Light fluxes $L_s$ and $L_c$ come from the cube 21 and sphere 22 through the lens 68 to form, as has been indicated, their respective images 71 and 72 in the plane of the pattern 70. The light fluxes continue through the transparency and fall on two phototubes 91 and 92. The two images and their respective phototubes are separated by the opaque screen 94 so that only light from the cube falls on the phototube 91 and only light from the sphere falls on the phototube 92. Each of the phototubes produces an output which is proportional to the light flux incident upon it.

Figure 8:
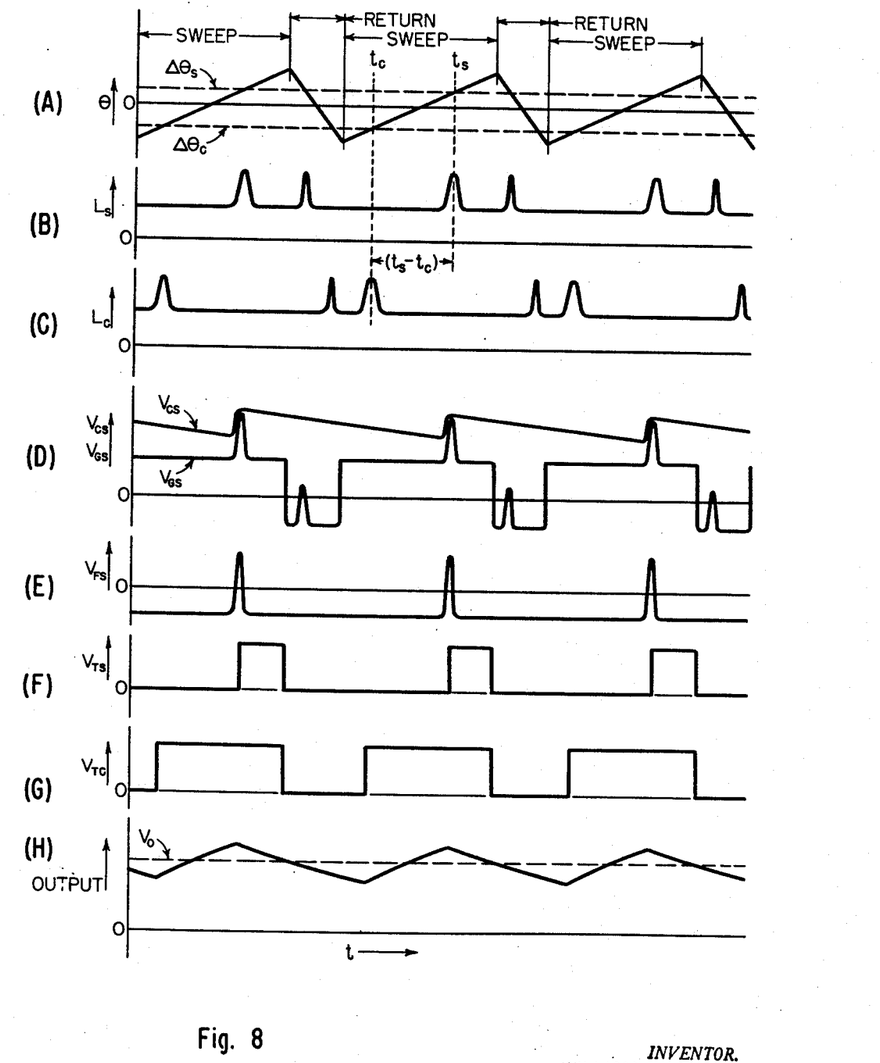
Fig. 8 is a plot of the signals at various points in the apparatus shown in Fig. 2, during the viewing cycles of the electro-optical means.

The waveforms of these time-varying light fluxes and the resulting voltages are shown in Fig. 8. The uppermost waveform (A) represents the variation in $\theta$ caused by the scanning mechanism, that is, the motor 58 and cam 56. The curve (B) shows the variation of the light flux $L_s$ with time as the X-eye 40 is rocked. The light flux shows a maximum at $t_s$ corresponding conditions of best match between the sphere image 72 and the sphere proxy 82. Similarly, the light flux $L_c$ from the cube shown in the third curve (C) of Fig. 8 shows a maximum at $t_c$ corresponding to the best match between the cube image 71 and the cube proxy 81. Since the sphere is displaced in the plus X-direction in respect to its correct relative position to the cube, the light flux maximum for the sphere occurs later in the cycle than that for the cube so that there is a positive error signal.

To derive an electrical error signal based on the waveforms of Fig. 8, it is required to generate an output whose sign and magnitude are proportional to the time difference between the two maxima occurring at $t_c$ and $t_s$. Various electronic techniques may be used for this purpose, hence the apparatus shown in Fig. 2 is to be regarded as illustrative only.

In Fig. 2 the outputs from the two phototubes are treated identically, so that the circuitry is shown only for the output from the phototube 92, which corresponds to light flux from the sphere 22. This output signal is amplified in the amplifier 102, which contains the appropriate number of tubes to provide a positive output pulse. Under operating conditions the voltage pulse corresponding to the light pulse may have an amplitude of the order of 5 to 50 volts. The amplitude is stabilized by an automatic gain control circuit operating from a long-time-constant circuit composed of resistors 104 and condensers 106 in the cathode circuit of tube 108, the time constant of the circuit being longer than a scanning cycle. The output from this R-C circuit may be fed back into the amplifier in a number of ways. It may for example be applied to the grid of a cathode follower in amplifier 102 to control the cathode bias of a remote cutoff tube in the amplifier, in accordance with conventional practices. The potential $V_{GS}$ of the cathode of tube 108 is shown as the upper of the two curves of the waveform (D) of Fig. 8. This potential is produced by the voltage $V_{GS}$ applied to the grid of tube 108 whose voltage waveform is also shown on the curve (D) of Fig. 8. This waveform shows two voltage pulses corresponding to the forward and return pulses of the light flux shown on the second curve of Fig. 8. The pulse on the return portion of the cycle is rendered ineffective in tube 108 by the application of a negative voltage applied by the rotating contacts 62 of Fig. 1. As can be seen in Fig. 2, the contact segment connects the grid of tube 108 to a negative source during the return portion of the sweep cycle. Therefore, the tube 108 conducts current only during the pulse produced on the forward scan since at all other times it is biased beyond cutoff by the potential stored in the long time constant circuit in its cathode circuit and by the negative potential applied to the voltage divider between the output of the amplifier 102 and the grid of tube 108. The pulse of current through tube 108, which occurs during the light pulse in $L_s$, produces the voltage waveform $V_{FS}$ on the grid of the thyratron 112 by means of the transformer 110, as shown at (E) in Fig. 8.

When there is no voltage from the transformer the thyratron is cut off by the negative voltage applied to its grid. The sharp rise of the output voltage of the tube 108 causes the thyratron to fire. The thyratron is cut off at the beginning of the return part of the viewing cycle, when its B+ contact reaches the non-conducting portion of the rotating contact 60 and cuts out the B+ plate voltage. Therefore, the output $V_{TS}$ of the thyratron 112 is a pulse whose duration is the time between the light flux maximum from the sphere and the beginning of the return part of the viewing cycle as shown at (F) in Fig. 8. Similar circuitry is applied to the output of the phototube 91 and the output (G) in Fig. 8. From its thyratron 111 is $V_{TC}$, a voltage pulse of duration equal to the time between $t_c$ and the beginning of the return part of the viewing cycle.

The two thyratron outputs are applied to two relays 114 and 116. The relays are so arranged that if the voltage pulse from thyratron 112 occurs before that from thyratron 111, a large negative voltage is applied to the circuit 118. If the pulse from the thyratron 111 is first, a large positive voltage $V+$ is applied. If neither of the relays or both of the relays are activated, no voltage is applied to the circuit 118. The circuit 118 is a charge-and-discharge circuit for the capacitor C, the discharge time constant $R_1C$ being greater than a scanning period. The resistor $R_2$ is large compared to $R_1$ so that the current through $R_2$ has substantially the same magnitude $(V+)/R_2$ whenever the circuit to $V+$ is closed. Thus a total charge of $(t_s-t_c)(V+)/R_2$ flows into the capacitor during the first part of the voltage pulse $V_{TC}$, that is, during the time intervals $(t_s-t_c)$ between the firing of thyratron 111 and the firing of thyratron 112. The average voltage on the capacitor and across $R_1$ will be such that this amount of charge flows out of the capacitor in each scanning cycle. If the period of the cycle is T, the average voltage will be approximately $$V_0 = (t_s-t_c)(V+)R_1/TR_2$$

as shown at (H) in Fig. 8. For $t_c$ greater than $t_s$, a negative voltage would be produced since, in this case, supply $V-$ would be active. This output voltage is applied, after suitable amplification, to the X-axis servomotor 28 to move the cube to its proper X-position with respect to the sphere.

It is evident that the circuit means described in connection with Figs. 2 and 8 represents but one way of practicing this invention. This particular means has been discussed because of its relative simplicity. It has, however, certain disadvantages for applications in which rapid operation is important. These disadvantages arise from the fact that long time constants are required in the cathode circuit of the tube 108 and the circuit 118. It is possible to design circuits operating on somewhat different principles which require no storage in the amplifier from one cycle to the next and wherein the output is dependent upon ($t_s-t_c$) only for the immediately preceding cycle. Such circuits may be designed on the basis of known principles of electronics and will permit maximum speed of operation consistent with the rate of scanning.

The apparatus of Fig. 2 is applicable to each of the "eyes" of Fig. 1. Similar eye units and circuitry may be employed, with appropriate patterns in the respective eyes corresponding to the different viewing positions. The three outputs from the viewers and their associated circuits are then employed to activate three servos to move one or the other of the objects until the position dictated by the pattern is reached.

Such a position might be, for example, a proper relation between piston and cylinder block for inserting the piston in the assembling of an internal combustion engine. At the same point in the production line, it might be desirable to insert the valves in their sleeves and then in their seats. Such a sequential series of operations would be patterned by a series of patterns of which could be arranged in frames as in a moving-picture film, or in separate patterns with means for changing patterns when one operation is complete, as shown at 69 in Fig. 2.

In the example suggested, the first series of patterns would establish the proper sequence of relations between the piston and cylinder block as the piston was brought to position. Zeroing of the error signal would actuate a mechanism to change to the next pattern. On the final pattern zeroing would actuate a release mechanism to drop the piston in, and to change to the pattern series for the valve and sleeve assembly operation. At the same time coded information could be stored on the sides of the patterns, as for example, by punched holes. Such information could relate to the next operation to be performed, or tolerances to be compared or what the machine is to do if there is some interference with proper operation, as, for example, if the piston does not fit.

Such a sequence of frames is particularly useful for a series of incremental operations, for example, where a milling machine is to take a series of cuts successively deeper. With the present invention the first cuts may be made as deep as efficient operation will allow, and the final cuts may be much less deep so as to achieve the desired tolerance.

The proxy for the sphere shown in Fig. 3 is essentially a photograph of the reference condition. It is possible, and may be desirable, to use proxies of quite a different nature. One disadvantage of the proxy of Fig. 3 is that the shape of the light pulse produced by scanning in the X-direction may be affected by errors in the Z-direction. This may be avoided by using a proxy of the type shown in Fig. 9, namely, a pattern 130 having a transparent strip 132 in the Z-direction in an opaque area 134. The transmissibility as a function of the X-coordinate is shown above the pattern. It can be seen that the light flux passing through the proxy is unaffected by displacements of the sphere image in the Z-direction. In operation the diameter of the sphere image should be somewhat greater than the width of the proxy.

Another disadvantage of the proxy of Fig. 3 is that a deflection of the sphere in the Y-direction may cause the image of the sphere to be of smaller diameter than its proxy. In such a case, there will be a range of θ over which the light flux passing through the pattern will have its maximum value, i. e., the total amount of light from the image of the sphere. This causes the maximum of the light flux from the sphere to have a flat top (cf. Fig. 8, B), and leads to inaccuracies. The proxy of Fig. 10 eliminates this disadvantage. The pattern 140 is streaked or smeared in the Z-direction, so that it maintains the X-eye insensitive to errors in the Z-direction. The transmissibility of the pattern is shown above it. The pattern comprises a proxy 142 which has greater transmission than the surrounding area 144, giving rise to a continuous function for transmissibility, as shown above the pattern. It can be seen that such a pattern will pass maximum light flux only when the center of the image of the sphere is aligned with the center of the area of maximum transmissibility 142.

Figure 11:
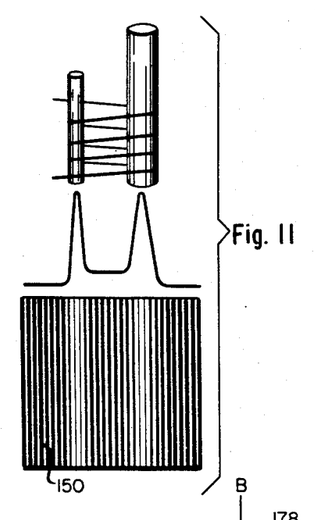
Fig. 11 illustrates a complex object (i. e., a vacuum-tube grid) and its control pattern with a plot of the transmissibility of the pattern.

As shown in Fig. 11, streaked proxies may be made for complicated shapes as well as the simple shape of a sphere. By way of example, Fig. 11 shows a vacuum tube grid structure and a streaked proxy 150 whose transmissibility (shown above the pattern) represents the desired image of the grid structure to an "eye" looking at the plane of the two support members. Streaked patterns of this sort can be formed in a variety of ways. For example, unexposed film may be placed in the "eye," the area desired for proxy left unmasked, while the rest is protected by an opaque mask. An exposure can then be made while rotating the "eye" at a uniform rate about an axis perpendicular to the optical axis and perpendicular to the axis about which scanning will be done. While this is done, the object alone is illuminated. Alternatively, a cylindrical lens can be introduced in the system to produce de-focussing in the desired direction. This can be done either while the primary exposure is made or during the printing of the positive. Alternatively, relative motion of the pattern and the light image can be used during the printing of the positive pattern in order to streak one or more of the proxies. The same effect can be produced by using an unstreaked proxy and adding a cylindrical lens or other astigmatic device in order to streak the image in the "eye."

The advantage of streaked proxies is to make the detection of errors in one coordinate insensitive to errors in the other two coordinates. However, complete streaking has disadvantages where the object viewed has large differences in brightness in the Z-direction. For such cases a clearer maximum in light flux will be obtained if the proxy is simply a photographic transparency representing the object as photographed through the optics of the "eye." If the errors in the Z-direction are sufficiently small, such a proxy will be satisfactory. The criterion of smallness will be that the errors are small compared to the dimensions of the most conspicuous light and dark areas of the object. If the errors are larger than this it may be advantageous to streak the proxy in the Z-direction by an amount roughly equal to the maximum Z-error expected.

A mathematical principle known as the Schwartz inequality can be employed in order to understand how a clear maximum of light flux can arise even for highly irregular shapes such as that of Fig. 11. In order to illustrate this we shall suppose that the illumination in the image along the X-direction, as measured on the pattern, is of the form $$dF = [B + I(x - \delta x)] dx$$

where $dF$ is the light flux in a strip of width $dx$, B is the background illumination, taken as uniform and constant and $I(x-\delta x)$ is the difference of illumination of the image of the object over the background. $\delta x$ represents the displacement of the image from its proxy on the pattern. Now suppose that the proxy has transmission of the form $$T(x) = C + P(x)$$

where C is the transmission of parts of the pattern not near the proxy and $P(x)$ is the increased transmissibility with respect to C which is the proxy itself. Then the light flux through the proxy will be $$L(\delta x) = \int [B + I(x-\delta x)][C + P(x)] dx$$
$$= BCW + B\int P(x) dx + C\int I(x-\delta x) dx$$
$$+ \int I(x-\delta x) P(x) dx$$

where W is the width of the pattern in the $x$-direction. Since $P(x)$ and $I(x-\delta x)$ are zero except over a narrow range of $x$ equal to the widths of image and proxy, the first two integrals will be independent of $\delta x$ during the scan so long as the image lies on the pattern; they can, therefore, be disregarded in considering the shape of the peak. Now the Schwartz inequality applied to real (not complex) functions like I and P states that $$\int I(x-\delta x) P(x) dx \leq |(\int I^2(x-\delta x) dx \int P^2(x) dx)^{1/2}|$$

and the equal sign holds only if the ratio $P(x)/I(x-\delta x)$ is a real positive number. From this it follows that if the transmission factor $P(x)$ is a real constant times $I(x)$, then the maximum can occur only when $\delta x = 0$.

Figure 9:
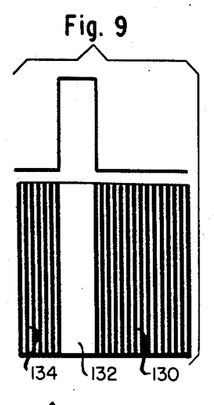
Fig. 9 illustrates a modified form of pattern which may be employed to advantage in certain applications of the invention.
Figure 10:
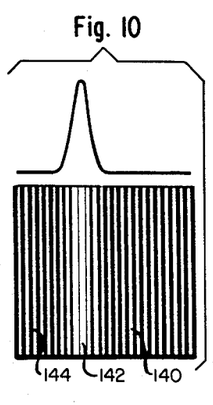
Fig. 10 illustrates still another form of object pattern, hereinafter termed a streaked proxy, for improving the response characteristic of the electro-optical means along a particular viewing coordinate.

This feature gives proxies of the form shown in Figs. 10 and 11 and having this relation between P and C, an advantage over those of the form shown in Fig. 9; a proxy such as that of Fig. 9 may give an error in position determination if the light flux in the image of the sphere is not symmetrical about its center in the plus and minus X-directions. It is also of significance that if the real-ratio relationship holds between I and P then L($\delta x$) is symmetrical so that L($\delta x$)=L($-\delta x$); this follows at once by changing variable to $x'=x-\delta x$ in the integrals. The analysis is similar in two dimensions.

There may be situations in which that maximum has a cusp instead of a rounded peak as shown in Fig. 10. There may also be situations in which the background illumination cannot be regarded as negligible, and may vary with the scanning deflection $\theta$. In such cases, a satisfactory pulse indicating the maximum can be obtained by singly or doubly differentiating the output of the phototube, by means of well-known electronic techniques. When such double differentiation is used it is necessary that the differentiating circuit give a response proportional to the square of the frequency up to a frequency of about $$\frac{2\omega}{\Delta\theta}$$

where $\omega$ is the angular frequency of the scanning and $\Delta\theta$ is the maximum permissible error in the determination of $\theta$ for coincidence.

Heretofore, it has been assumed that there have been no errors in rotational orientation. The technique already discussed for determining error in relative position may be adapted to determine the orientation of an object with respect to its proxy in the pattern. This may be done, for the case of rotation about the Y-axis as observed by the X-eye of Fig. 1, by treating the top and bottom of the object as separate objects. Rotation about the Y-axis results in an error in the X-direction for the relative positions of these ends. This error can be made, by circuit means like those discussed in connection with Fig. 2, to produce an error signal proportional to the rotation. It should be noted that the rotation measured by this means is not the relative rotation of one object with respect to another, but instead the relative rotation between the object and its pair of proxies in the pattern.

Relative orientation can be obtained, however, by using four phototubes and determining simultaneously the orientation errors of two objects with respect to their proxies in the pattern. The difference in these orientation errors will be independent (to a first approximation) of the rotation of the pattern about the Y-axis and hence will give the relative orientation to a high degree of accuracy. The error signal in such a case may be taken as the voltage difference between two output voltages such as the bottom-most curve of Fig. 5, one corresponding to top and bottom of one object and the other to top and bottom of the other. Care must be taken in making a proxy to insure that equal angular errors in the two objects produce equal deviations between the top and bottom light flux maxima. This condition can be approximated by making a separation of top and bottom proxies equal for the two objects. A difference in the proportionality factor between angular errors and error signal for the two objects can, of course, be corrected for by using different voltage supplies in the two final relay circuits.

The method of determining orientational errors just discussed is only one of a number of possible methods. If one object is being moved by several controls and it is desired to control its rotational orientation, then a possible procedure is to stop the motion of the "eye" when the condition of best match is obtained. Under these conditions the object can be rotated with the same control that would be used for positioning it. As it rotated to the position corresponding to best match, a maximum in the light flux would occur which could be used to control the orientation.

In the embodiment of the invention shown in Fig. 2, the light fluxes due to the two objects 21 and 22 were separated spatially. This embodiment has the merits of simplicity and efficiency, but would lead to complications in a system in which the objects moved in such a way that the image of one or both crossed the light-separating screen 94. It is possible to do away with the screen 94 and use the entire light flux through the pattern 70. One way of doing this is to illuminate the objects with flickering light by using light choppers or stroboscopic lights. If each object is illuminated by a different frequency, then the signals from each object can be separated by filter circuits into separate channels. In this case, the modulation due to motion of image with respect to pattern modulates a carrier frequency corresponding to the periodically varying light. Then, the separation of the carrier frequencies should be larger than the highest frequency of the light flux that it is desired to transmit, in order to obtain the desired positional accuracy.

Color and color filters may also be used to achieve the separation. The light flux through the pattern may be divided into two roughly equal parts by a half-silvered mirror, the two parts passing through filters to two separate phototubes. One tube may be behind a blue filter and one behind a red filter. The pattern 70 may use a blue transparency for the cube proxy and a red transparency for the sphere proxy. Then the phototube behind the blue filter is especially responsive to the cube image and the phototube behind the red filter is especially responsive to the sphere image. There will inevitably be some mixing of red and blue due to imperfect filtering, but this may be corrected in a large measure electrically, by substracting from the sphere current a fraction of the cube current determined by the known imperfection of the filtering process.

A combination of color in the proxy and use of the second derivative furnishes an effective means of separating the signals from two objects, even when one lies partly in front of the other. Under these conditions the proxies will show the important highlights of each object so that the rapid transition from increasing to decreasing light flux required for the electronics will occur. Of course, if the obscuring object lies wholly in front of the other object and both are of uniform brightness the location of the first object cannot be detected by optical means. The contrast between the objects is increased by coloring the objects and filtering their respective proxies and phototubes. This coloring can be done either on the objects themselves and the illumination furnished by white light, or alternatively each object may be illuminated with the appropriate color. The combination of color and double differentiation will usually suffice to obtain clearly different signals from the two objects.

It is of course possible to use more than two colors to separate more than two objects. Where only two objects are to be separated it may be possible to use polarizing filters, such as sheets of "polaroid," to separate the two objects. Periodically varying light, color and polarization can all be used in combination for the purpose of separating the signals from various objects or parts of them and their respective proxies.

It should also be noted that relative motion between the image and the pattern may be achieved in other ways besides that shown in Fig. 1, where the optical system as a whole was rotated. The same result may be achieved by viewing the object as reflected in a mirror and rotating the mirror about an axis passing through its surface and the optic axis of the eye. Such a rotation will produce substantially the same relative motion as might be accomplished by rotating the optical system. Alternatively, the pattern alone may be moved, leaving the lens in its fixed position. Or the lens may be moved, leaving the pattern in place. Alternatively a set of patterns may be provided having the proxies at progressively advancing positions on the X-axis but at the same spacing and the relative motion may be achieved by running these patterns through frame-by-frame as in a motion picture projector or in a strip. The objects themselves may move. The method most convenient for any particular application will depend on the engineering factors involved and the particular process to be carried out.

The motion need not be restricted to translation in one direction. A given "eye" may be used in generating error signals for two directions by rotating it first about one axis and then about another. Simultaneous periodic motion at different frequencies may also be used and suitable circuits can be designed to give separately the two components of error.

It should be noted that the invention can be used to determine absolute positions by making one of the objects a fixed object with respect to which errors may be determined. Alternatively an indication of absolute position can be obtained by deriving an electrical pulse from an additional cam on the shaft which transmits a signal at a fixed value of $\theta$, usually $\theta=0$. This may be used in circuits like those of Fig. 2 to compare the position of an object with a fixed direction. This method will suffice to bring objects into approximately their correct absolute positions after which their relative positions may be more precisely controlled by the pattern alone.

Figure 12:
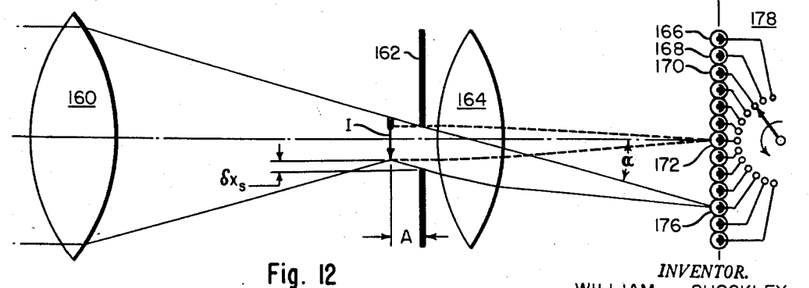
Fig. 12 is a diagrammatic view of another form of electro-optical system for comparing an optical image of an object with a pattern or proxy thereof, for the purpose of deriving a control signal as a function of the positional discrepancy.

An alternative method for determining error in relative position is represented in Fig. 12. In this method the comparison of image and proxy positions is made without relative physical motion but with the aid of a multiplicity of photocells. In Fig. 12 a lens 160 forms a real image I of one of the objects, (the sphere of Fig. 1 for example) at a distance A in front of the pattern 162. This real image may be regarded as a light source so far as the pattern and subsequent optics are concerned, each point in the real image emitting rays of light in a cone determined by the solid angle between the point and the lens 160.

If the pattern is of the nature described in Fig. 3, then the real image will be seen through the transparent circle that constitutes its proxy. If the sphere is in the correct absolute position, its real image falls directly in front of its proxy. If, however, it is displaced by a distance $\delta x_s$, then its image will lie displaced at a distance $\delta x_s'$ in respect to its proxy P as represented in Fig. 12. Consequently, if the pattern is observed along the optic axis from a distance, only a portion of the image will be seen through the proxy. If the pattern is viewed from an angle $\alpha$, where $\alpha = \delta x_s'/A$, however, the real image will appear directly behind the proxy and all points in the proxy will appear bright. In effect, changing the angle of viewing causes by parallax an apparent relative motion of image in respect to proxy. The light flux in these various directions depends, therefore, upon direction in a manner similar to that described in connection with Figs. 4, 5, 6 and 7 for the dependence of light flux upon $\theta$. The purpose of the lens 164 is to convert this dependence of light flux upon direction to a corresponding dependence upon position. The lens 164 focusses the light flux for each direction of light into a point on its focal plane B. A number of photocells 166, 168, 170, etc., are provided at the plane B. In particular the light flux in a small range of directions near the optic axis will be focussed upon the photocell 172 in Fig. 12 and the light in a small range of directions at an angle from the optic axis will be focussed on photocell 176. It is evident that photocell 176 will receive more light flux than any other photocell if the angle is such as to make the image I appear by parallax to be aligned with the proxy in the pattern 162.

The system shown in Fig. 12 causes a maximum photocurrent to flow in the photocell that corresponds most closely to the absolute error in position $\delta x_s$ for the sphere. The relative error between two such objects is then proportional to the difference in position between the two photocells giving maximum response. Conventional circuit means (such as the sequential switch shown at 178) may be used to select the cell with the maximum response in each set, to convert this to a voltage proportional to angle and to take the difference between the voltages due to sphere and cube so as to obtain an error signal. The accuracy of this system is limited by the number of photocells that are employed since the minimum difference that can be detected reliably corresponds to the interval between adjacent cells. A system with finer resolution can be produced by producing a voltage proportional to an average of the positions of each photocell, each photocell being weighted in accordance with its photocurrent. Although the system of Fig. 12 is more cumbersome than the scanning systems, it may be preferred in some cases because it gives a continuous indication of error. Furthermore, it can be extended to two dimensions by having a square rather than a linear array of photocells. It should also be noted that although the sequence: image, pattern, lens 164, represented in Fig. 12 has been chosen for purposes of exposition, from the point of view of optical efficiency the sequence: pattern, lens, image, is preferable, but the reasoning is essentially the same as before.

It may be helpful in the practice of the invention to note certain solutions to problems which can arise in operation. Where the image is moved past its proxy and the maximum is determined electrically, either directly or through differentiating circuits, an error may rise because of the delay in the differentiating circuit. The error may differ from one object to another because of differences in the shapes of their respective light flux curves. It is possible to eliminate this error by making use of a double sweep. In such a case the error signal is generated as described above during the sweep in one direction, and then the same amplifying circuits are used again to generate an error signal in another set of circuits, like those associated with the vacuum tubes 108 and 112 and the relays 114 and 116 in Fig. 2. Since the light flux response curves will be nearly symmetrical about their maxima, the errors due to distortion in the amplifiers and in the pulsing circuits will be equal in time delay and opposite in direction for the forward and reverse sweep. As a consequence, the error signal obtained by averaging the two error signals from the two sweeps will substantially eliminate errors due to circuit delay.

It is to be understood that, in such uses of this invention as automatic production, assembly and the like, a series of patterns may be used, instead of a single pattern. Such patterns could, for example, be mounted in motion picture film which is moved past the viewing lens as desired. At different sequences of the operation it may be desirable to suppress in some frames the proxies of some objects which are temporarily stationary. Furthermore, it may be desirable to provide different lenses for a single "eye" so that at some stages a greater magnification is available, thus permitting more precise adjustment. It may also be desirable to use a larger or smaller number of "eyes" than are shown in Fig. 1 and to shift control from one to another of these in the progress of the operation. It may be desirable to use bifocal lenses, whereby one object would be sharply focussed by one part of the lens and diffusely focussed by the other, and the reverse true for the other object, the diffusely focussed portion functioning in much the same manner as a streaked pattern.

It should be noted that a limited depth of focus may have definite advantages in some applications. In particular, if a strong pattern in the background is present, its effect may be largely eliminated by focussing on the object or objects of interest and leaving the background out of focus. Under these conditions, no sharp maxima or minima in light flux through the pattern would occur due to the background as pattern and image moved in respect to each other. The object, however, being in focus would produce usable sharp maxima.

The presence or absence of sharp responses can be used to make a self-focussing system. For example, the focus can be altered from one sweep to the next and the sweep giving the sharpest response recorded in a memory circuit. This information can then be used to activate servos to bring the lens in the optimum focus position.

It may be noted that in addition to determining the relative positions of objects, the principles of the invention may be used to determine which of several alternative situations prevails. For this purpose, patterns corresponding to a number of possible situations may be used successively in the eyes and memory circuits used to determine which gave the best match. This stored information could then be used to select the sequence of patterns among several possible sets that was appropriate to the existing situation.

An alternative procedure to the frame-by-frame method may be used in assembly operations and the like with the aid of streaked patterns. Thus instead of having a pattern limited as in Fig. 9 a continuous strip may be used in which the X-position of the proxies varies along the length of the strip, and the strip is moved continuously through the eye as the operation progresses. Such continuous patterns in a sense resemble optical cams which continuously guide the parts through a preassigned course by sending error signals to the servomotors. It should also be noted that the scanning motion of pattern and image can be accomplished readily on such continuous patterns by making the proxies move together in the X-direction in a saw tooth pattern or other form of cyclic scan. Coded signals may be incorporated on the edges of the strip-pattern and "read" by photocells in order to accomplish control operations.

Of importance in high speed operation is the signal to noise ratio of the photosensitive devices, since with high speed operation the band-width of the amplifier is increased and the noise power from the photosensitive device also increases. Standard methods of increasing signal to noise such as increasing the level of illumination, using photo-multiplier tubes in place of photocells and so on may be used to optimize the design in any application.

The sharp maximum in light flux due to matching of highlights or edges of image and proxy may be preserved while reducing the total light flux by darkening all areas of uniform transmission in the proxy. This should be done so as to taper the added darkening down to nothing at high contrast parts of the proxy. The advantage of this technique is that it will permit operation at higher levels of illumination without overloading photosensitive devices such as photomultipliers or phototransistors.

It will be obvious that the invention may be carried out with negative patterns instead of positive patterns, or with a bright background against which the objects appear as black areas. The invention includes the use of reflected light from opaque patterns or partly reflected and partly transmitted light. Patterns employing high reflecting mirror-line proxies may be used. In such cases, a point light source or parallel beam may be provided to cast sharp shadows of the object upon the pattern, with no intervening lenses.

Furthermore, instead of viewing the object as a whole, it may be preferable to view only fiducial marks on the object being projected. If the object has polished reflecting surfaces, it may be advantageous to operate with special illumination, such as small focussed light sources to produce highlights on the object. Mirrors may, of course, be used as focussing devices instead of lenses. Although the use of visible light has been stressed, it should be noted that the invention may be practiced with invisible radiation as well. For example, if opaque objects are involved, X-rays may be used. In this case the X-ray pattern may be converted to light with the aid of fluorescent screens or patterns made of dense metal may be employed directly with the X-rays.

It will be understood that my invention is capable of many equivalent variations, and is to be regarded as limited only by the appended claims.

Having thus described my invention. I claim:

1. In a positional control system having power-operated positioning means responsive to error signals, means for generating error signals from optical inspection of the positions of a plurality of objects, comprising a control pattern having proxies thereon corresponding to the objects, means for forming object images in optical relation to the pattern, light-sensitive means responsive to the light fluxes of the images as modified by the respective proxies of the pattern, means for varying the relation between image and pattern seen by the light-sensitive means, means for generating from the light fluxes a signal for correspondence of images and proxies, and means for generating error signals for control of the power-operated means in accordance with the differences between said correspondence signals.

2. In a positional control system having power-operated positioning means responsive to error signals, means for generating error signals from optical inspection of the positions of a plurality of objects, comprising a control pattern whose light-passing properties vary in accordance with the desired positions of the objects to form proxies for the objects, optical means for forming object images passed by the pattern, light-sensitive means for generating outputs responsive to the light from the images passed by the pattern, means for varying the relation between image and pattern and thereby varying the passed light flux, means for generating from the light-responsive outputs signals for correspondence of each object image with its proxy, and means for generating error signals for controlling the power-operated means in accordance with the differences between said correspondence signals.

3. Apparatus for generating signals indicating errors in the relative positions of a plurality of objects comprising a control pattern having proxies thereon corresponding to the objects, means for forming object images in optical relation to the pattern, means generating outputs responsive to the light fluxes of the images as modified by the respective proxies of the pattern, means for varying the optical relation of the images to the pattern and thereby varying the light fluxes, means for separating the light flux for one object from the rest of the light flux, means for generating from the light flux for each object a signal based on correspondence of image and proxy, and means for generating error signals from the differences between said correspondence signals.

4. In a positional control system having power-operated positioning means operative in a plurality of co-ordinates and responsive to error signals, means for generating error signals from optical inspection of the positions of a plurality of objects comprising viewing means for the respective coordinates, each viewer comprising a control pattern having proxies thereon corresponding to the desired positions of the objects in the said coordinate, means for forming object images in optical relation to the pattern, light-sensitive means responsive to the light fluxes of the images as modified by the respective proxies of the pattern, means for varying in each viewer the relation between image and pattern in its coordinate seen by its light-sensitive means, means for generating from each of the light-sensitive means a signal for correspondence of image and proxy in one coordinate, and means for generating error signals for each coordinate from the differences between said correspondence signals in one coordinate.

5. In a positional control system having power-operated positioning means responsive to error signals, means for generating error signals from optical inspection of the positions of a plurality of objects, comprising an opaque control pattern having thereon areas of transparency corresponding to the desired positions of the objects, means for forming images of the objects, the light from the images passing through the pattern, means for separating the light flux for one object from the rest of the light flux, photocell means responsive to the separate light fluxes passing through the pattern to generate separate outputs for the light fluxes, means for periodically varying the position of the images with respect to the pattern, means for generating signals from said outputs upon correspondence of image and proxy for each of the objects, and means for generating error signals from the differences between said correspondence signals.

6. In a positional control system having power-operated positioning means responsive to error signals, means for generating error signals from optical inspection of the positions of a plurality of objects, comprising an opaque control pattern having thereon areas of transparency corresponding to the desired positions of the objects, means for forming images of the objects at a distance from the pattern transparencies, a plurality of photocell means to generate outputs responsive to light from the images passing through the pattern transparencies to a plurality of positions displaced from the pattern transparencies, means for selecting for each object the photocell means responsive to the light flux resulting from correspondence of image and proxy for each object, and means for generating error signals from a difference in photocell means for the several objects.

7. In a positional control system having power-operated means for relatively positioning a plurality of objects, means for controlling said power-operated means to position said objects according to a predetermined program of control comprising a plurality of patterns having proxies thereon corresponding to the objects, said proxies being disposed on the control patterns in accordance with the desired relative positions of the objects at successive stages in the control program, means operative by radiant energy for viewing the objects and for forming images thereof on the pattern, radiation-sensitive means responsive to the radiation fluxes of the respective proxies and images, means actuated by the radiation-sensitive means for generating control signals as a function of the positional discrepancy between images and proxies, and means for supplying said signals to the power-operated means to effect relative movement of the objects toward substantial registration of images and proxies.

8. In a positional control system having power-operated means for relatively positioning a plurality of objects, means for controlling said power-operated means to position said objects according to a predetermined program of control comprising a plurality of patterns having proxies thereon corresponding to the objects, said proxies being disposed on the control patterns in accordance with the desired relative positions of the objects at successive stages in the control program, means operative by radiant energy for viewing the objects and for forming images thereof on the pattern, a radiation-sensitive means responsive to the radiation fluxes of the respective proxies and images, means for effecting relative motion between images and pattern to vary the radiation fluxes, means for generating error signals as a function of the time difference in correspondences of images and proxies for the respective objects, and means for supplying said signals to the power-operated means to position said objects according to the pattern relationship.

9. In a positional control system having power-operated means for relatively positioning a plurality of objects, means for controlling said power-operated means to position said objects according to a predetermined program of control comprising a plurality of patterns having proxies thereon corresponding to the objects, said proxies being disposed on the control patterns in accordance with the desired relative positions of the objects at successive stages in the control program, means operative by radiant energy for viewing the objects and for forming images thereof on the pattern, a radiation-sensitive means responsive to the radiation fluxes of the respective proxies and images, means for periodically effecting relative motion between images and pattern to vary the radiation fluxes generated by the several images as modified by the respective proxies, means for generating signals upon substantial correspondence of an image and proxy, means for determining the time difference between correspondence signals for said objects, and means for converting said time differences to error signals for controlling the power-operated means in accordance with the positional departure of said objects from the relative positions of the control pattern.

10. In a positional control system having power-operated means for relatively positioning a plurality of objects, means for controlling said power-operated means to position said objects according to a predetermined program of control comprising a plurality of patterns having proxies thereon corresponding to the objects, said proxies being disposed on the control patterns in accordance with the desired relative positions of the objects at successive stages in the control program, means operative by radiant energy for viewing the objects and for forming images thereof in relation to the pattern, a radiation-sensitive means responsive to the radiation fluxes of the respective proxies and images, means actuated by the radiation-sensitive means for generating control signals as a function of positional discrepancy between images and proxies, means for supplying said signals to the power-operated means to effect relative movement of the objects toward substantial registration of images and proxies, and means operative upon substantial registration of images and proxies of one control pattern for introducing another control pattern into control relation with the object images.

References Cited in the file of this patent

UNITED STATES PATENTS

| Number | Name | Date |
|---|---|---|
| 2,145,116 | Howard | Jan. 24, 1939 |
| 2,404,770 | Bennett | July 30, 1946 |